Aug. 26, 1969      A. H. MORGAN      3,463,212
OKRA ORIENTER AND TRIMMER
Filed Nov. 2, 1967      2 Sheets-Sheet 1
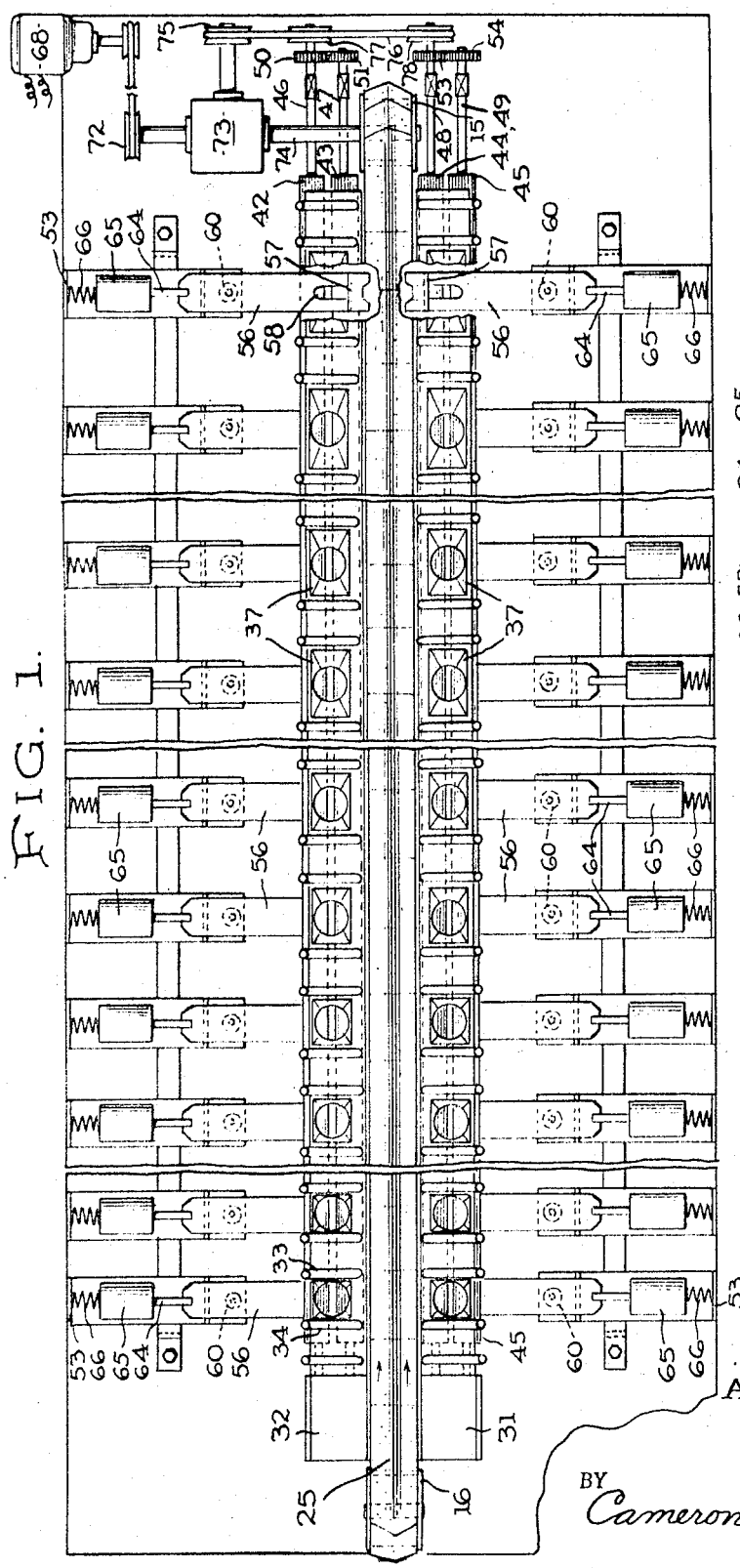
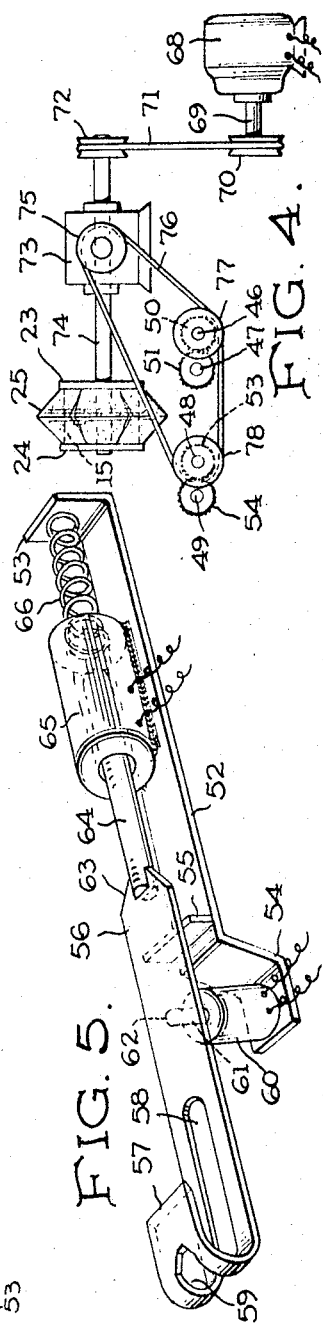
INVENTOR
ARTHUR H. MORGAN
BY Cameron, Kerkam & Sutton
ATTORNEYS

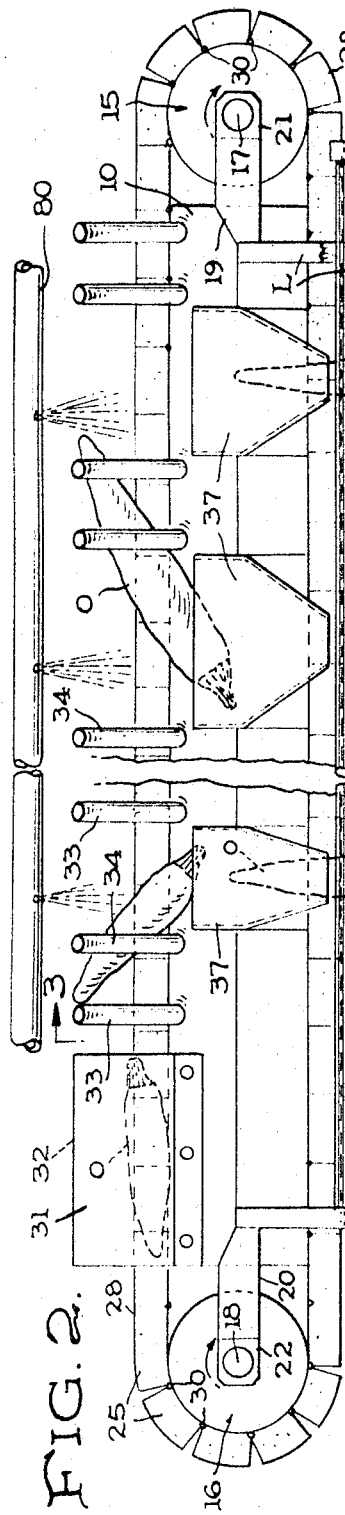

United States Patent Office 3,463,212
Patented Aug. 26, 1969

3,463,212
OKRA ORIENTER AND TRIMMER
Arthur H. Morgan, Knoxville, Tenn., assignor to The University of Tennessee Research Corporation, Knoxville, Tenn., a corporation of Tennessee
Filed Nov. 2, 1967, Ser. No. 680,216
Int. Cl. A01d 23/04, 55/02; B02c 9/04
U.S. Cl. 146—81
10 Claims

ABSTRACT OF THE DISCLOSURE

This okra orienter and trimmer comprises an elongate bed or beam, longitudinally of which is moved a V-shaped endless belt, laterally of which are disposed paired, spaced idler rollers, between which are vertically disposed bins into which okra carried by the belt are dropped from the rollers in vertical position, for trimming of their stalk ends by solenoid-actuated blades disposed beneath the machine. Parallel, counter-rotating, longitudinal rollers are mounted under the beam, aligned with the bins, above the solenoid-actuated blades, to pull the okra downwardly from the bins into engagement with the blades and, after trimming thereof, to pull the okra downwardly beneath the blades onto an endless conveyor which transfers the okra to a further processing station. The entire machine is preferably mounted on a shouldered base, to make it unitary.

Background of the invention

The processing and trimming of okra in quantities has always been a problem, due to the curvature of the okra and its uneven length, shape and weight distribution. The okra is normally an elongate vegetable of roughly circular cross section, the stem or pod end of which is enlarged and weighty, the opposite end of which is progressively attenuated and of much less weight than the pod extremity. In view of this shape and curvature the matter of transporting okra for processing and trimming has always been a problem due to its tendency to "bunch-up" on a conveyor and to its tendency to erratic travel and movement by virtue of its curvature and weight imbalance.

In the past, various attempts have been made to solve the problem of conveying and assorting quantities of okra, most of which have been, at best, only partially successful.

The usual manner of processing and trimming okra is by hand, but this is slow and laborous and requires much manual labor.

Thus, in the prior art various types of perforated belt conveyors have been suggested, as exemplified by Oldershaw et al. Patent No. 3,255,864, in which the perforations in the belt are progressively enlarged to accommodate various sizes of okra and to thus classify or distribute the okra according to its diameter.

A patent of interest is Watson Patent No. 1,486,259, which shows an endless conveyor with idler rollers angularly disposed longitudinally of its lateral edges for the retention of articles being conveyed on the conveyor.

The present machine was developed to produce a machine which would first properly align okra along each side of the conveyor in a continuous operation and would then facilitate the dropping and trimming thereof from the conveyor, in accordance with the length of the individual okra.

While certain of the prior art structures may suggest minor aspects of the present combination, no prior art reference was found disclosing the novel combination of a V-shaped endless belt, paired, differentially spaced idler rollers angularly disposed along the belt, vertical, open bins disposed therebeneath, parallel driven rollers beneath the bins and solenoid-actuated blades disposed beneath the driven rollers, to trim the stem and pod extremities of the okra.

Summary of the invention

To summarize the invention, it comprises an elongate beam or frame member, on the order of 6–8 feet in length, at the extremities of which are vertically mounted rotatable pulleys which are peripherally shouldered to support a V-shaped endless belt which runs thereover and over the upper and lower surfaces of the frame member in a clockwise direction, one of the terminal pulleys being driven from a power source. The lateral, upper edges of the base are preferably downwardly inclined at an angle of about 45° and on these angular surfaces pairs of idler rollers are mounted at 90° to the surfaces in such fashion that their lower extremities are closely adjacent the outer, lateral edges of the V-shaped conveyor belt. Vertically disposed on the side walls of the beam are a series of open bins or funnels which are reduced to their open, lower extremities and which are spaced between the pairs of rollers to receive okra tipped downwardly from the rollers by the interaction of the V-shaped endless belt and the rollers.

Positioned beneath the lower, open extremities of the bins are pairs of parallel, counter-rotating soft rubber rollers, driven from the same source of power which drives the endless conveyor which, by virtue of their counter-rotation, grasp the lower or stalk end of an okra which has fallen into a bin and pull in downwardly into contact with the cutter blade, which cuts the stem extremity therefrom. The rollers then pull the cut okra downwardly to deposit it on a belt conveyer beneath the machine. A base is provided for the machine, to make it unitary.

It is therefore a primary object of this invention to evolve a machine which will receive a quantity of okra of varying lengths, weights, and curvatures and which will longitudinally assort the okra, convey it over appropriate bins into which it drops, is cut and is subsequently conveyed away beneath the machine.

It is another object of this invention to provide such a machine in which paired idler rollers are angularly disposed at each side of a V-shaped conveyor belt to assist in the conveying and distribution of the okra in accordance with the various lengths thereof.

It is a further object of this invention to provide such a machine which will handle all sizes and shapes of okra with equal facility and in which the operation is continuous and the trim uniform.

Other and further objects of this invention will become apparent as this specification proceeds.

Brief description of the drawings

Referring to the drawings, FIG. 1 is a top elevation of the machine, partially in phantom and broken; FIG. 2 is a partial side elevation of the machine shown in FIG. 1, partially in phantom and broken; FIG. 3 is a vertical, sectional view of the machine, taken on line 3—3 of FIG. 2, and partially in phantom; FIG. 4 is a schematic, partial end elevation of the drive assembly for the machine and FIG. 5 is a detailed, perspective view of a cutter blade unit, partially in phantom.

Description of the preferred embodiment

Referring to the drawings, the frame or beam 10 comprises an elongate, substantially rectangular beam which is flattened at its upper and lower surfaces 11 and 12, its upper, longitudinal facets 13 and 14 being angularly inclined downwardly at an angle of some 45° from the lateral edges of upper surface 11 thereof. Beam 10 may be formed of wood, metal or of any other suitable material and is appropriately supported above the base B and parallel thereto by suitable leg or support members affixed to base B.

Base B is provided, upon which the machine is mounted, to make it unitary and to properly position and coordinate the various elements thereof. As shown, base B is preferably formed of steel or analogous metal, is provided with rectangularly disposed, upstanding side walls W, extending its full length and is of a length equal to the length of the machine and of a width slightly greater than the width of the machine, between side walls W, see FIG. 3.

Vertically mounted at each extremity of beam 10 are shouldered pulleys 15 and 16, provided, respectively, with axles 17 and 18. Pulleys 15 and 16 are mounted at the extremities of beam 10 in suitable paired brackets 19 and 20, in the extremities of which axles 17 and 18 are rotatably mounted in bearings 21 and 22 whereby pulleys 15 and 16 are freely rotatable in the same vertical plane. Pulleys 15 and 16 are preferably of a diameter equal to the width of beam 10 between its upper and lower surfaces 11 and 12.

As indicated, pulleys 15 and 16 are preferably shouldered about their outer peripheries at 23 and 24 to provide a defined bearing surface thereabout for segmented V-shaped endless belt 25, which, as shown, is flattened on its lower surface 26 and is brought to a sharp 90° V-shape at its upper surface 27.

V-shaped belt 25 is preferably formed of hard rubber segments 28 appropriately hingedly connected at their lower joining extremities 29 as by appropriate hinge and pin means 30 for articulated movement of segments 28 thereof along the plane upper and lower surfaces 11 and 12 of beam 10 and over the outer, peripheral surfaces of pulleys 15 and 16. Pulley 16 is preferably an idler pulley and pulley 15 is preferably the drive pulley for V-belt 25, driven from an appropriate source of power by shaft and belt means, as will hereinafter be more fully discussed.

V-belt 25 is preferably rotated over pulleys 15 and 16 and the upper and lower surfaces of beam 10 in a clockwise direction, at a relatively slow rate of speed, as will hereinafter be discussed at more length.

Paired angular guide plates 31 and 32 are shown mounted on each side of the entering extremity of beam 10, at an angle of 90° to each other and aligned on each side of V-belt 25. Guide plates 31 and 32 are preferably bolted or otherwise affixed to the sides of beam 10 and are preferably spaced apart at their lowe extremities at a distance slightly greater than the base width of V-belt 25, but closely adjacent to the lower, lateral edges thereof. Guide plates 31 and 32 are designed to receive okra from a feed bin or source and act to align the okra on each face of V-belt 25, with their concave surfaces upwardly, as they enter the machine.

A series of aligned, paired, idler rollers 33 and 34 are provided, extending outwardly to each side of V-belt 25 from angular surfaces 13 and 14 of beam 10 at an angle of 90° thereto, adjacent the outer, lateral edges of V-belt 25, as shown, whereby okra delivered between the guide plates 31 and 32, at the entry end of the machine, will be conveyed along each side of V-belt 25 between the faces of V-belt 25 and the pairs of rollers 33–34, as will hereinafter be more fully discussed.

Rollers 33 and 34 are preferably freely and rotatably mounted on axles 35 and 36 which are, as aforesaid, vertically fixed in the outer surfaces of angular facets 13 and 14 of beam 10 adjacent the outer, lower edges of V-belt 25, whereby okra O pulled in a clockwise direction by V-belt 25 will pass over freely rotating rollers 33–34 and will be conveyed between the angular faces of belt 25 and the paired idler roller system.

Rollers 33–34 are preferably spaced apart 1½" to prevent the escape of okra transported on the faces of V-belt 25 from falling therebetween. As shown, rollers 33–34 preferably make an angle of 90° with the faces of V-belt 25.

Passing lengthwise of beam 10 the pairs of rollers 33–34, which are constantly spaced apart 1½" in each unit, are progressively spaced further apart, preferably in groups of three, down the length of beam 10, i.e., the first three pairs of rollers are spaced apart 2", the second three pairs are spaced apart 2½", the next three pairs are spaced 3" apart, the next 3½", and the last three pairs are spaced 4" apart, at the terminal end of the machine, for a purpose hereinafter more fully to be discussed.

Affixed vertically on the side walls of beam 10, between the pairs of idler rollers 33–34 and located therebeneath are okra receiving bins 37 which are preferably in the form of open-ended rectangles of a width at their upper extremities 38 slightly less than the distance between the pairs of paired rollers 33–34, as shown in FIGS. 1 and 2. At their lower extremities 39 bins 37 are preferably downwardly reduced into an open neck 40, provided at its lower extremity with exit opening 41 of a diameter slightly larger than the maximum diameter of an okra falling therethrough, to maintain an okra therein in substantially vertical position as it issues therefrom, as will hereinafter be more fully discussed.

It will be noted that as the spacing between the groups of paired idler rollers 33–34 is increased, the width of the bins 37 at their tops 38 is progressively increased to conform to the increased spacing between the paired idler rollers. The conforming of the width of bins 37 to the spacing between the paired rollers is designed to insure proper reception of the okra in the respective bins in accordance with their length and mass, as will hereinafter be more fully discussed.

It will thus be seen that normally there are fifteen (15) bins and cutting stations down each side of the machine, between the paired rollers.

This progressively increasing spacing of the groups of paired rollers is designed to adapt the machine to okra of various lengths and to prevent jamming or piling-up of the okra on the V-belt, or in the bins as will hereinafter be more fully discussed.

Bins 37 are preferably formed of light sheet iron or other metal and are of elongate, rectangular shape at their open, upper extremities and, as aforesaid, are then reduced downwardly into frusto-pyramidal lower sections 40 provided with a central, bottom orifice 41 through which the falling okra passes.

Disposed longitudinally beneath each side of base 10 and beneath bins 37 are spaced, parallel feed rollers 42–43 and 44–45.

As shown, paired feed rollers 42–43 and 44–45 are preferably longitudinally aligned in parallel and are spaced apart beneath the lower edges of beam 10, under the open extremities 41 of bins 37 and closely disposed therebeneath to receive the stem ends of okra issuing downwardly by gravity from the exit openings 41 of bins 37.

Rollers 42–43 and 44–45 are preferably formed of soft rubber, are spaced apart in parallel about 1" and extend longitudinally under the beam 10 of the machine from a point ahead of the first pair of idler rollers 33–34 to a point beyond the last pair thereof. Rollers 42–43 and 44–45 are supported, respectively, on axles 46–47 and 48–49 which are appropriately supported horizontally in bearing brackets vertically affixed to the base B beneath beam 10. Roller axles 46–47 are provided with spur gears 50 and 51 at their outer extremities, which are intermeshed to provide counter-rotation to rollers 42 and 43, respectively. Roller axles 48 and 49 are also provided with meshing spur gears 53 and 54 at their outer extremities to provide counter-rotation to rollers 44 and 45, respectively, each pair of rollers rotating inwardly, whereby the stem end of an okra descending from a bin 37 will be caught therebetween and pulled downwardly thereby. As shown, rollers 45 and 43 are preferably rotated in a clockwise direction, while rollers 42 and 44 rotate in a counter-clockwise direction.

The spur gears are preferably driven from the same source of power which drives the V-belt 25, as will hereinafter be discussed at more length.

Rectangularly disposed in alignment beneath bins 37 and feed rollers 42–43 and 44–45 are blade or cutter units which act to cut the stem or head extremities from okra pulled downwardly from bins 37 between the feed rollers, as will hereinafter be more fully discussed.

As the cutter blade units are identical, only one unit will be described in detail, as follows: Each of the blade units, as shown in detail in FIGS. 3 and 5, is mounted on a base bar 52 which is provided with a rectangular shoulder 53 at its outer extremity and with a depressed step portion 54 at its inner extremity. Adjacent the step portion of bar 52 is an upstanding, rectangular shoulder 55 which provides a sliding bearing surface and guide for the blade 56. At its inner, upper extremity flattened blade 56 is provided with a returned or hooked cutting edge 57, and with an elongate central slot 58 extending into the recurved, extremity 57 thus leaving a central slot 59 therein, for a purpose to be discussed.

Vertically supported on step 54 at the inner extremity of base 52 is a microswitch 60 provided with a spring-pressed detent 61, which, as shown, when in normal, upward position bears at its rounded, upper extremity 62 against the lower surface of blade 56. It will be noted that blade 56 rests on the upper surface of shoulder 55, which maintains it in true horizontal position, as will hereinafter be more fully discussed.

As shown in FIG. 3, a support may be provided between base B and the lower surface of step 54, to stabilize the blade unit. This support may be made integral with step 54, if desired.

At its outer extremity 63 blade 56 is affixed in the end of armature 64 of a solenoid 65, as shown in FIG. 5, in axial alignment with armature 64 and movable therewith. Solenoid 65 is preferably welded, as by long welds shown in FIG. 5, to the upper surface of base bar 52, in axial alignment thereon.

Provided between the outer extremity of armature 64 and shoulder 53 of base 52 is a coil spring 66 which is compressed between the outer end of armature 64 and shoulder 53, when armature 64 is drawn into and through solenoid 65.

Suitable circuitry is provided between microswitch 60, a source of AC supply and solenoid 65, whereby when detent 61 of microswitch 60 is depressed and the microswitch is tripped the coil of solenoid 65 will be energized from the AC source to pull armature 64 into solenoid 65, compressing spring 66 and pulling blade 56 and its cutting edge 57 outwardly beneath bin 37 and rollers 42–43 or 44–45 to cut the stem extremity of an okra pulled downwardly from bin 37 between rollers 42–43 or 44–45, as shown in FIGS. 2 and 3.

As shown in FIGS. 1 and 3, the blade units are disposed in parallel, at right angles to rollers 42–43 and 44–45, aligned beneath bins 37 and are progressively spaced further apart, as the idler roller spacing increases to the terminal end of the machine. As shown, rectangular outer shoulders 53 of the blade units are affixed to the vertical side walls W of base plate B, as by welding or other appropriate means, to maintain the blade units in true horizontal alignment beneath the feed rollers and bins.

The action of the knife system is as follows: When an okra falls downwardly into a bin 37 and its stem end extends downwardly through the bottom orifice 41 of the bin into contact between the counter-rotating feed rollers 42–43 or 44–45, as the okra is pulled downwardly by the rollers its stem extremity will pass through slot 58 in the upper surface of blade 56, as shown in FIG. 3. The stem then passes down through slot 58 until the shoulder of the okra, at the base of the stem, contacts the blade. This contact forces blade 56 downwardly against detent 61 of microswitch 60, thus energizing solenoid 65, which pulls blade 56 and its recurved cutting edge 57 outwardly, removing the stem end of the okra, which is being pulled downwardly between the feed rollers. As the cutting edge passes the okra on its outward movement the okra is further pushed downwardly through notch 59 in the extremity of blade 56 and is then dropped beneath the machine in a trimmed condition.

It will be noted that the cutting edges 57 of blades 56 are closely disposed beneath the feed rollers and the depth of cut made by curved cutting edge 57 in the end of the okra depends upon the distance between edge 57 and the upper surface of blade 56. Thus, where the okra are large and a greater cut is required this space may be increased.

In view of the fact that the armature spring 66 is compressed by the outward movement of armature 64, as soon as pressure is relieved against blade 56 and the solenoid is de-energized the compressed return spring 66 will force the armature 64 back through solenoid 65, placing blade 56 in inward, "ready" position to cut the next okra delivered.

Suitable conveyor means are provided on base B beneath the knife units 50 and 51 to convey the trimmed okra away from beneath the machine. This means usually takes the form of an endless belt conveyor 67 moving on appropriate rollers and powered from the same power source which drives the V-belt 25 and the feed rollers 42–43 and 44–45 whereby the trimmed okra delivered beneath the machine are conveyed to a suitable packing or disposal station.

The power system for the machine, shown in FIG. 4, will now be discussed. The power source comprises broadly an electric or other motor 68, mounted on the base platform B and provided with an appropriate shaft 69 and pulley 70 at the extremity of shaft 69. An endless belt 71 connects pulley 70 to pulley 72 of a speed reducer unit or gear box 73 also mounted on the base platform, above motor 68. Shaft 74 of gear box 73 is keyed directly to the center shaft of drive pulley 15 of endless belt 25 and thus drives pulley 15 directly.

A lateral drive pulley 75 is provided on gear box 73, driving endless belt 76 which runs over pulley 77 of the right spur gear system (50–51) and pulley 78 of the left spur gear system (53–54), driving, respectively, feed rollers 42–43 and 44–45 beneath bins 37 of the machine. Pulley 77 is preferably affixed to the extremity of roller axle 46, as shown, and pulley 78 is preferably affixed to the extremity of roller axle 48, thus, respectively, driving rollers 42 and 44 directly, in a counterclockwise direction and driving rollers 43 and 45, respectively, in a clockwise direction, through the intermediary of meshing spur gears 51 and 54, affixed, respectively, to the extremities of roller axles 47 and 49 of rollers 43 and 45.

As previously indicated, the V-belt 25 is preferably driven at a comparatively slow rate of speed, i.e., about 35 f.p.m., and the feed roller systems 42–43 and 44–45 are also driven at a comparatively slow rate of speed, i.e., surface speed of 19 f.p.m., sufficient to clear the okra from the bins 37 as they descend by gravity therethrough.

It will thus be seen that all moving parts of the machine, i.e., the V-belt 25, the counter-rotating feed rollers 42–43 and 44–45 and the lower conveyor 67 are preferably all driven from the same source of power, i.e., motor 68.

The operation of the machine, broadly, is as follows: Okra, which may be from 3 to 6 inches in length, and which may vary widely in curvature, diameter and weight are delivered to the entry end of the machine from a suitable supply hopper, between angular guide plates 31 and 32 disposed on each side of the forward extremity of endless V-belt 25. Angular guide paltes 31 and 32 act as a "hopper" at the "entry" end of V-belt 25 wherein the okra are moved downwardly into contact with the lateral faces of V-belt 25, with their concave surfaces upward. Thus, it will be seen that an okra is normally disposed on each angular face of V-belt 25 as it enters the machine between the first pair of idler rollers 33–34.

As the space between the idler rollers in each pair is 1½" it is impossible for an okra to fall between the rollers of each individual pair, but as the spacing between the first three pairs of rollers is 2", if the okra is on the order of 3" in length it will pass over the second roller 34 of the first pair of rollers and will then tip downwardly, as shown in FIG. 2, due to its length and the concentration of weight in its stem end, and will fall downwardly into the first vertical bin 37, its stem end extending downwardly through bin orifice 41 to be grasped between counter-rotating rollers 42–43 or 44–45. The okra is then pulled downwardly by the rollers and contacts blade 56, energizing solenoid 65, through switch 60. Cutting edge 57 of blade 56 is then pulled outwardly, cutting off the stem end of the okra. The rollers then pull the cut okra downwardly past notch 59 in the end of blade 56 whence it falls onto endless conveyor 67 beneath the machine.

Where the okra is of a length of approximately 4", as it is conveyed in a clockwise direction past the first set of rollers 33–34 it will bridge the space between the first and second sets of rollers, i.e., 2", due to its length, and will then pass on into the next extended space of 2½" between the second and third groups of rollers, whence it will drop downwardly into the next larger bin 37, for the aforesaid downward pulling and cutting action.

Where the okra are of extreme length, i.e., over 6", they will normally be transported by V-belt 25 and the paired idler roller system toward the terminal end of the machine, where the space between the pairs of rollers is 4", where the width of the space will tip the okra downwardly into one of the appropriate terminal bins 37 for trimming and downward delivery to the endless conveyor 67.

It is unimportant whether the stem end of an okra enters the machine first or not. As the stem end is the largest and heaviest part of the okra, if the okra is delivered to the V-belt and pulley system with the stem end to the rear the okra will tip of its own weight when it reaches the proper space between the paired rollers and will thus tip downwardly into the appropriate bin 37 with its stem or heavy end in downward position for cutting by the cutting edge 57 of blade 56, as aforesaid.

Due to the cooperation between the angular walls of belt 25 and the angularly disposed paired idler rollers the curvature and position of an okra between a face of the V-belt and the idler rollers is comparatively unimportant and proper positioning of the okra in bins 37, prior to cutting, is insured.

If desired, a water spray pipe 80 may be provided running longitudinally above the center of the machine, provided with spaced, aligned holes in its bottom, as shown in FIGS. 2 and 3, to moisten the okra on each side of belt 25.

Throughout, equivalents may be substituted for all elements of this combination without departing from the spirit of the invention.

The machine may be used for trimming many types of elongate fruit or vegetables, in addition to okra.

This specification is by way of description of a preferred embodiment of the invention only and nothing therein is intended to limit the scope of this invention.

Attention is directed to the appended claims for a limitation of the scope of this invention.

I claim:

1. In an okra orienter and trimmer, an elongate beam, pulleys vertically and rotatably mounted at each end of said beam, a V-shaped endless belt mounted over said pulleys for longitudinal movement over said elongate beam, paired idler rollers mounted laterally of the upper extremities of said beam adjacent said endless belt, vertically disposed, open bins mounted laterally of said beam between said paired rollers, parallel longitudinally disposed driven rollers aligned beneath said bins receiving and grasping okra descending therethrough, blade means disposed rectangularly beneath said paired rollers, aligned beneath said bins, solenoids disposed outwardly of said blade means, armatures in said solenoids affixed to the extremities of said blades in longitudinal alignment therewith, switches beneath said blades in circuit with a power source and with said solenoids whereby a descending okra pulled down between said driven rollers will impinge against said blade, depress said switch and actuate said solenoid to retract the blade and sever the stem end from the okra, after which the trimmed okra is pulled downwardly by said rollers and dropped beneath said base onto a suitable conveyor.

2. A machine in accordance with claim 1 in which the V-shaped belt is moved in a clockwise direction at slow speed.

3. A machine in accordance with claim 1 in which the paired idler rollers are disposed at an angle of about 90° to the walls of said V-shaped belt.

4. A machine in accordance with claim 1 in which said paired idler rollers are progressively spaced further apart.

5. A machine in accordance with claim 1 in which the bins are downwardly reduced to their lower extremities.

6. A machine in accordance with claim 1 in which said knife means are returned upwardly at their outer extremities to a depth of the desired cut.

7. A machine in accordance with claim 1 in which the paired, longitudinally disposed driven rollers are closely spaced beneath said bins and are formed of rubber.

8. A machine in accordance with claim 1 in which said paired driven rollers are counter-rotated at slow speed.

9. A machine in accordance with claim 1 in which all moving parts are driven from the same power source.

10. A machine in accordance with claim 1 in which angular guide plates are provided on each side of the beam at the entry end of the machine to direct okra to each side of said V-belt.

References Cited

UNITED STATES PATENTS

| | | | |
|---|---|---|---|
| 2,435,762 | 2/1948 | Urschel | 146—86 X |
| 2,696,234 | 12/1954 | Trappey | 146—81 |
| 2,934,207 | 4/1960 | Steber | 209—97 |
| 3,234,983 | 2/1966 | Oldershaw | 146—81 |

ANDREW R. JUHASZ, Primary Examiner

Z. R. BILINSKY, Assistant Examiner

U.S. Cl. X.R.

146—151, 224; 206—109; 209—103